US005455942A

United States Patent [19]

Mohan et al.

[11] Patent Number: 5,455,942
[45] Date of Patent: Oct. 3, 1995

[54] PARTIAL PAGE WRITE DETECTION FOR A SHARED CACHE USING A BIT PATTERN WRITTEN AT THE BEGINNING AND END OF EACH PAGE

[75] Inventors: Chandrasekaran Mohan, San Jose; Inderpal S. Narang, Saratoga; James Zu-chia Teng, San Jose, all of Calif.

[73] Assignee: International Business Machines Corporation, Armonk, N.Y.

[21] Appl. No.: 955,076

[22] Filed: Oct. 1, 1992

[51] Int. Cl.⁶ .......................... G06F 15/167; G06F 11/08
[52] U.S. Cl. ...................... 395/600; 395/480; 364/243.4; 364/260.2; 364/265.3; 364/282.3; 364/285.4; 364/DIG. 1; 364/964.27; 364/DIG.7
[58] Field of Search ................... 395/600, 425; 364/243.4, 260.2, 265.3, 282.3, 285.4, 964.27

[56] References Cited

U.S. PATENT DOCUMENTS

| | | | |
|---|---|---|---|
| 4,005,405 | 1/1977 | West | 340/146.1 |
| 4,271,521 | 6/1981 | Mahmood | 371/51 |
| 4,445,174 | 4/1984 | Fletcher | 364/200 |
| 4,453,216 | 6/1984 | Chiba et al. | 364/200 |
| 4,483,003 | 11/1984 | Beal | 371/51 |
| 4,847,754 | 7/1989 | Obermarck et al. | 364/200 |
| 4,882,642 | 11/1989 | Tayler et al. | 364/200 |
| 4,920,536 | 4/1990 | Hammond et al. | 371/10.1 |
| 4,939,636 | 7/1990 | Nakagawa et al. | 364/200 |
| 5,023,776 | 7/1991 | Gregor et al. | 395/425 |
| 5,043,943 | 8/1991 | Crisp et al. | 365/189.1 |
| 5,048,024 | 9/1991 | Robeck et al. | 371/49.1 |
| 5,265,232 | 11/1993 | Gannon et al. | 395/425 |
| 5,287,473 | 2/1994 | Mohan et al. | 395/425 |

OTHER PUBLICATIONS

Crus, et al., "Partial Data Page Write Detection" *Technical Disclosure Bulletin*, IBM, Apr. 1983 vol. 25, No. 11B.
Partial Data Page Write Detection. Apr. 1983–Crus et al–Technical Disclosure Bulletin, Apr. 1983, p. 5889.

*Primary Examiner*—Thomas G. Black
*Assistant Examiner*—Jack M. Choules
*Attorney, Agent, or Firm*—Baker, Maxham, Jester & Meador

[57] ABSTRACT

Disk check bits refer to bit patterns stored in particular bytes of a page which are used to detect errors in writing the page to storage. Every time a page is obtained from storage, changed from the version retained in storage, and written back to storage, the check bit pattern on the changed page is altered to be different from the bit pattern on the storage page. This is because the changed page overwrites the stored page. The invention provides a method for managing the check bits in a multi-DBMS system employing a high-speed shared electronic store as a store-in cache for all pages obtained from disk storage. When a page is first obtained from disk storage by a DBMS and changed, check bit information for the page is maintained in a directory of the storing cache which indicates what the patterns are for the version of the page in the disk storage. All pages which are modified are stored in the store-in cache and are only returned to disk storage from the cache. Therefore, when a page is to be written to disk storage, the DBMS writing the page to storage processes the check bits on the page itself, changing them as required based on the check bit information stored in the directory for the page.

9 Claims, 3 Drawing Sheets

PARTIAL PAGE WRITE DETECTION FOR A SHARED CACHE USING A BIT PATTERN WRITTEN AT THE BEGINNING AND END OF EACH PAGE

CROSS REFERENCE TO RELATED APPLICATIONS

This application is related to the following co-pending U.S. Patent Applications, both assigned to the assignee of this application:

1. U.S. patent application Ser. No. 07/627,315, filed Dec. 14, 1990, for "NON-BLOCKING SERIALIZATION FOR REMOVING DATA FROM A SHARED CACHE"; now U.S. Pat. No. 5,287,473 and 2. U.S. patent application Ser. No. 07/628,211, filed Dec. 14, 1990, for "NON-BLOCKING SERIALIZATION FOR CACHING DATA IN A SHARED CACHE", now U.S. Pat. No. 5,276,835.

Both of these applications are incorporated herein by reference.

BACKGROUND OF THE INVENTION

This invention concerns a multi-system, data sharing complex, and particularly concerns maintenance of the ability to detect errors occurring when data is written to secondary storage in a shared cache system.

Figure 1:
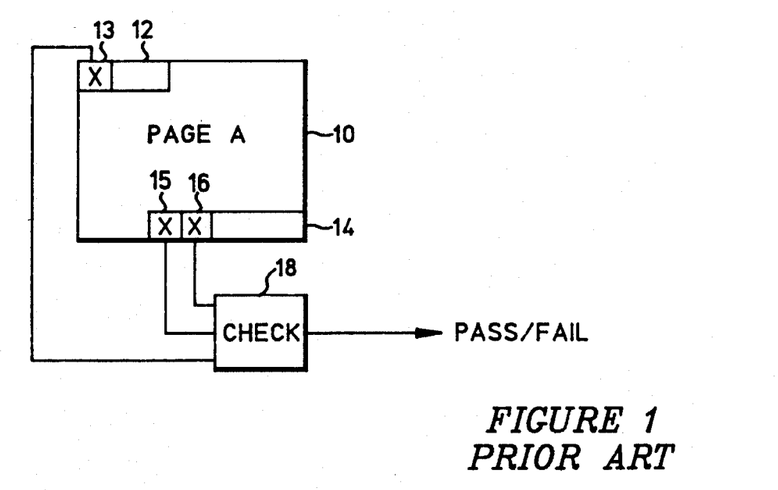
FIG. 1 is a schematic diagram illustrating the role of check bits in the detection of write errors according to a prior art technique.

In the prior art, detection of write errors occurring during storage of logical units of a database, such as pages, is provided by check bits which occur at the beginning and end of a logical unit. For example, consider FIG. 1 wherein a logical page 10 of data includes first and last bytes 12 and 14, respectively. The first bit 13 of the first byte 12 and the first two bits 15 and 16 of the last byte 14 are designated as "check bits" whose role is to support the detection of errors occurring when the page is written to secondary storage. In this regard, the technique used initializes the first bit 13 to a particular value and the first two bits 15 and 16 to a corresponding value. Since the bit 13 can be set to two values, the bits 15 and 16 are set to two different values corresponding to the 0 and 1 possibilities of the first bit 13. For example, assume the following correspondence: when the bit 13 is set to 0, the bits 15 and 16 are set to 10, and when the bit 13 is set to 1, the bits 15 and 16 are set to 11. Assume when DBMS wrote page 10 to disk first time ever, it set bit 13 to a particular value and bits 15 and 16 to the pattern which corresponds to the value of bit 13. Next, page 10 is read from secondary storage and entered into the buffer of, for example, a database management processor. If the page must be written back to the secondary storage because it was changed by the processor, the bits 13, 15 and 16 are "flipped" in that the bit 13 is set to its complementary value and the bits 15 and 16 are set to the associated pattern for that value. The check bits are flipped before the write operation and the bytes of the page 10 are written in first-byte to last-byte order to secondary storage. Subsequently, when the page is read from secondary storage, the reading system tests the relationship between the first and last byte of the page in, for example, a check circuit 18. If the relationship is the expected one described above, the page passes the test and it is assumed that the write to storage was error free. If it is not, the system infers that the last secondary storage write of the page was a partial one and, hence, there has been a data loss. In such a situation, the system recovers the page using a backup copy and log information. This technique is described in the article by Crus, et al entitled "Partial Data Page Write Detection", in the Technical Disclosure Bulletin, April, 1983, pp. 5589.

The write error detection procedure is practiced in systems limited to a single database management system (DBMS) which reads a page from a secondary storage device into a buffer on demand. A transaction updates the page in the buffer, and the DBMS writes the page back to storage sometime later. In this environment, the page state goes from "clean" to "dirty" with respect to the secondary storage upon the first update. Relatedly, when the page state goes from clean to dirty, the check bits are flipped, no update is allowed to the page while being written back to secondary storage, and after the storage write, the page is marked as clean so that the check bits can be altered on a subsequent update.

In a multi-system data sharing environment such as is described in the cross-referenced patent applications, a shared electronics store, hereinafter referred to as the "store", is a high-speed hardware assist for maintaining coherency of data among a plurality of DBMS's. The store is a "store-in" cache in that an updated page is written to the store first without immediately writing, not back to secondary storage. A DBMS can write an updated page to the store quickly and the page can be quickly refreshed in the store by other DBMS's.

The multi-DBMS architecture does not accommodate the write error detection technique as practiced in the prior art. The DBMS which reads a page from the store rather than from secondary storage may obtain a page which is already dirty with respect to secondary storage because it was updated by another system. To maintain the correct value of the check bits, the updating system must alter them only when the page changes state from clean to dirty with respect to secondary storage. Otherwise, an even number of updates made to the page by different systems would cause the check bits to be set to an incorrect value.

Further, in the multi-DBMS architecture, the system which returns the page to secondary storage may be different than one which dirties the page. The prior art write error detection technique is based on the assumption that the updating system is the one which returns the page to secondary storage. If this rule were followed in the multi-DBMS architecture, unacceptable overhead would result. The system returning the page to secondary storage would have to acquire a global lock on the page and would have to inform the other systems which have the page cached that the page state has changed from dirty to clean with respect to secondary storage. However, the return of a page to secondary storage in the multi-DBMS architecture in referenced U.S. application Ser. No. 07/627,315 contemplates a non-blocking serialization for removing a page from store.

Accordingly, in any multi-DBMS architecture in which the pages are returned to secondary storage from a shared store-in cache, there is a need to provide for the correct processing of check bits when a page may be returned to secondary storage by a system other than a system which updated the page.

SUMMARY OF THE INVENTION

The invention solves the problem of check bit processing in a multi-DBMS architecture in which pages are not globally locked when they are returned to secondary storage by maintaining check bit information in a directory entry for the page in the store and using the check bit information in the directory entry to synchronize check bit processing by a DBMS which returns the page for secondary storage.

Accordingly, the principal objective of the invention described below is to provide write error detection to the secondary storage by check bit processing in a multi-DBMS architecture.

The achievement of this and other objectives and significant advantages by the invention will be appreciated when the following detailed description is read with reference to the below-described drawings.

DETAILED DESCRIPTION OF THE PREFERRED EMBODIMENT

In this description, the term "secondary storage" refers to a particular level of storage in a hierarchical storage system. The other levels are working memory of one or more database management processors and a high-speed, store-in cache ("store") to which all processors are connected for fast access to data. All processors are also connected to secondary storage which may comprise, for example, disks, direct access storage devices (DASD's), optical storage devices, and electro-optical storage devices. The term "page" when used in this description is not meant to be limiting, but is intended to provide a convenient reference to a fixed-length block of data that is transferred as a unit between secondary storage and a processor's working memory. Last, the writing of a page to secondary storage implies overwriting a previous version of the same page in a storage device and is referred to as "castout".

Figure 2:
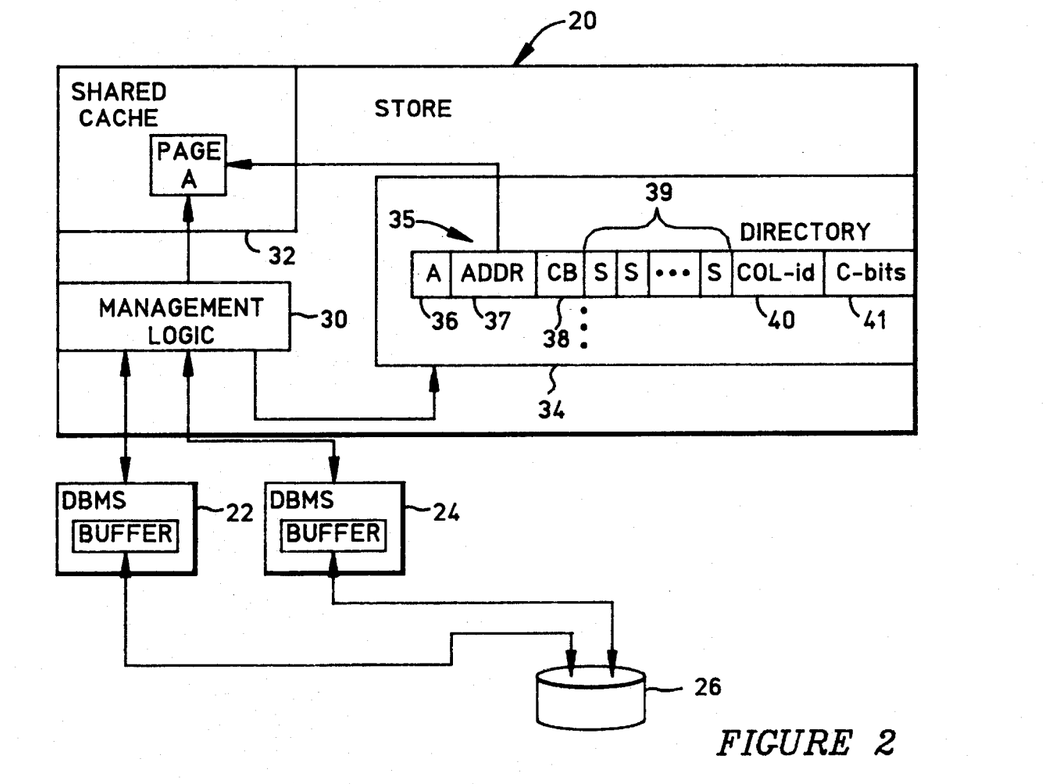
FIG. 2 is a block diagram illustrating the architecture in which the invention is practiced.

FIG. 2 illustrates the architecture in which the invention is practiced. In the invention, a high-speed, shared electronic store (STORE) 20 is connected to a plurality of database management processors, two of which are indicated by reference numerals 22 and 24. Each database management processor is a processor of the general purpose type whose software complement includes a database management system (DBMS). Each database management processor includes working memory in which a reserved addressable area comprises a buffer used by the locally-executing DBMS. Each of the processors 22 and 24 is coupled by conventional functional and physical means to a secondary storage 26 which may include one or more storage devices.

The inventors contemplate that the store 20 can comprise a processor-controlled, high-speed storage entity including management logic 30 and a large high-speed data storage component 32 which operates as a shared stored-in cache. The database management processors can be of the IBM 3090 type with appropriate operating systems which will execute database management software such as IBM's DB2 and IMS systems. The secondary storage may be a DASD of the IBM 3390 type.

A directory 34 is maintained by the management logic 30 to manage the contents of the shared cache 32. The directory 34 is a table of multi-field entries, with each entry corresponding to a page. In the operation of the system illustrated in FIG. 2, when a DBMS needs data, it first attempts to read it from the store 20. If not in the store, the DBMS obtains the data from the secondary storage 26. Each attempt by DBMS to read data from the store 20 results in the management logic 30 inspecting the directory 34 for an entry corresponding to the requested page. If there is no entry for the page in the directory 34, the management logic 30 will create one, anticipating entry of the page into the shared cache 32. When DBMS obtains the page from the secondary storage 26, it will process the page as required, and pass the page as a changed page to the store 20 for caching and maintaining coherency.

The control mechanization of the store 20 includes returning changed pages to the secondary storage 26 by way of a castout process in which a database management processor reads the page from the store 20 into its own working memory and writes it from there to the secondary storage 26.

Each directory entry comprises a multi-field data structure. A representative entry for a page named "A" is denoted by reference numeral 35. This entry is representative of all other page entries in the directory 34.

The entry 35 includes a plurality of fields, some of which are shown in FIG. 2. The entry 35 includes a name field 36 which names a page and an address field 37 which points to the location of the page in the shared cache 32.

A change bit (CB) is included in the field 38. The change bit has a value of 1 if the cached page has been changed with respect to the version of the page retained in the secondary storage 26. Such a page is non-stealable from the store 20 until it is written to secondary storage. The change bit can also have a value of 0. If the change bit has a value of 0 and the castout lock identification (COL-id) field (described below) is also 0, the version of the page in shared cache is the same as that stored in the secondary storage 26. Such a page is stealable without a write to secondary storage.

A group of bits 39 comprise a system validity bit vector. This vector has one bit per DBMS attached to the store 20. If set to 1, the page cached in the corresponding DBMS's memory is valid. If 0, the page cached in the DBMS's memory is not valid. The size of this bit array is implementation dependent.

The castout lock identification (COL-id) field 40 is set to a numerical value of 0 when a castout is not in progress for the named page. Otherwise, this field is set to a value s when a castout is in progress by DBMS s.

Last, the field 41 contains check bits of the version of the page which is in secondary storage 26.. The size and value range of this field is implementation dependent. In the discussion which follows, it is assumed that the check bits of the page are as described above with reference to FIG. 1. Relatedly, in the preferred embodiment, the check bits field 41 contains the first two bits in the last byte of a page such as bits 15 and 16 of byte 14 illustrated in FIG. 1. The value of the first bit of the first byte of a page can be directly derived from the value of these bits. In the preferred embodiment, the check bits field 41 is two bits wide and can take on values 00, 10, and 11; the value 01 is reserved. In this regard, the value 00 implies that the value of the page check bits is unknown; this value is referred to as the "null" value. A value of 10 in the field 41 implies that the first bit of the first byte of the page has a value of 0; the value 11 implies that the first bit of the first byte has a value of 1. When a directory entry is allocated in the store, the check bits field 41 is initialized to the null value. Hereinafter, the bits in this field are called "C-bits" and are distinguished from the check bits in the corresponding page.

For the purposes of this description, the multi-DBMS architecture of FIG. 2 supports at least the five commands listed in Table I with the understanding that other commands and processes inherent in the management and operation of database management systems will also be supported. Among these, without limitation, are READ and WRITE commands directed to the secondary storage 26. It is assumed that the READ from secondary storage command processing in any DBMS includes the check bits procedure illustrated in FIG. 1. Relatedly, if the check bits have a pattern indicating an error in the page, the page will FAIL and DBMS will institute procedures to reconstruct the page. Otherwise, if the checking procedure indicates PASS the page will be handled according to the following description.

TABLE I

READ PAGE (page id, Buffer Address)

WRITE PAGE (page id, CB, Buffer Address, C-bits)

READ-FOR-CASTOUT (page id, Buffer Address, system id)

UNLOCK-CASTOUT-LOCK( page id, system id, C-bits)

RESET-CASTOUT-LOCK (page id)

The READ PAGE command is issued by a DBMS to the store 20 and requests a named page (page A for illustration) to be returned to the DBMS at the named buffer address. If page A exists in the store, the store returns the page at the buffer address in the working memory of the DBMS. Otherwise, the store 20 returns a non-zero return code. Relatedly, if the page is not in storage, a cache miss occurs which is indicated in the return code and the management logic 30 of the store 20 creates a directory entry for the page. A cache hit occurs if there is a directory entry for the page and the page is in shared cache 32. In the event of a cache hit, the management logic 30 returns an indication whether the page was changed or unchanged and also returns the C-bit field value if the page was unchanged.

The WRITE PAGE command is issued by a DBMS to the store 20 and writes the named page from the named buffer address in the DMBS to the store. The command writes a changed page to the store with CB=1 and an unchanged page to the store with CB=0. The DBMS also pass the C-bits value in the write page command. In response to the WRITE PAGE command, the management logic 30 of the store 20 sets the CB in the directory entry to the CB value provided in the command parameter list and processes the C-bits. In processing the C-bits, the store 20 accepts non-null C-bits provided by the command if the C-bits in the directory entry are null and the corresponding page is unchanged with respect to its version in the secondary storage. In this latter regard, the page is unchanged if both the CB and COL-id fields are 0.

The READ-FOR-CASTOUT command is explained in detail in U.S. patent application Ser. No. 07/627,315. To cast out a changed page, a DBMS issues the READ-FOR-CASTOUT command identifying the page, the buffer address to which the page is to be written by the store, and its own identification. When casting out page A, DBMS s reads page A from the store 20 to its processor's memory. Thereafter, it writes the page to secondary storage. After secondary storage I/O is complete, the DBMS issues the UNLOCK-CASTOUT-LOCK command. Note that the version of page A returned to DBMS s by the store 20 in response to the command is the one which would be written (castout) to secondary storage. Since this is a non-blocking command, updates may be made to page A while this command is executing. Any updates made to page A after this command completes are accepted by the store 20 by setting CB=1 in the directory entry for the page, but leaving the COL-id field unchanged. This supports non-blocking serialization between write and castout as explained in the incorporated patent application. If the COL-id in page A's directory entry is non-zero, the READ-FOR-CASTOUT is rejected. This prevents two different systems from trying to cast out the same page, which can result in an overlay of the most recent version of the page in secondary storage. In response to this command, the store 20 sets the CB field to 0, the COL-id field to s, returns page A to the buffer address, and returns the value of the C-bits field to the issuing DBMS.

The UNLOCK-CASTOUT-LOCK command tells the store 20 that the named page has been cast out successfully by system s. During processing of this command, the store 20 leaves the CB field in the directory entry for the named page unchanged. Therefore, if the page is changed between the time the READ-FOR-CASTOUT is issued and the UNLOCK-CASTOUT-LOCK command is issued, a more recent version of the page would exist in the store and an older version would be castout to secondary storage. In this regard, the CB field can be set to a value of 1 in the directory entry by a WRITE command following a READ-FOR-CASTOUT command. In case the page is not updated while the castout is in progress, the secondary storage version would be the same as the one in store 20 and the page would become a candidate for replacement in the store. In response to the unlock-castout-lock command, the store updates the C-bits in the page's directory entry with the C-bits provided and sets the COL-id field to 0. The system-id parameter provided in this command is only for verification that the system which issued READ-FOR-CASTOUT is allowed to issue UNLOCK-CASTOUT-LOCK command.

The RESET-CASTOUT-LOCK command is typically issued by a software recovery process for directory entries which have non-zero values in their COL-id fields in case of software or processor failure during castout. In response to this command, the store 20 sets the CB field for the identified page's directory entry 1, the COL-id field to 0, and places the null value in the C-bits field. Since a WRITE to secondary storage might not have occurred before the failure which elicited this command, it is conservative to set the CB field to 1.

OPERATION OF THE INVENTION

The present invention is practiced by storing in a directory entry for a particular page the check bit patterns which are on the version of the page in secondary storage. When a page is read from secondary storage, modified, and written to the store 20, the check bits on the page itself are not changed. When the page is cast out to secondary storage, the check bits on the page itself are flipped, if necessary. When the castout lock is unlocked by the UNLOCK-CASTOUT-LOCK command, the flipped bit pattern is returned to the store 20, which enters the pattern into the directory entry for the page whether or not the page has been changed in the meantime. Therefore, the check bits of the secondary storage version of the page are always represented by the non-null value of the C-bits in the directory entry of the page in the store. The null value of C-bits implies that the value of check bits of the page on secondary storage is not known. The invention ensures that the check bits will be flipped each time a WRITE to the secondary store occurs, thereby ensuring the validity of the check bit test described above with reference to FIG. 1 at the next time the page is READ from secondary storage.

Figure 3A:
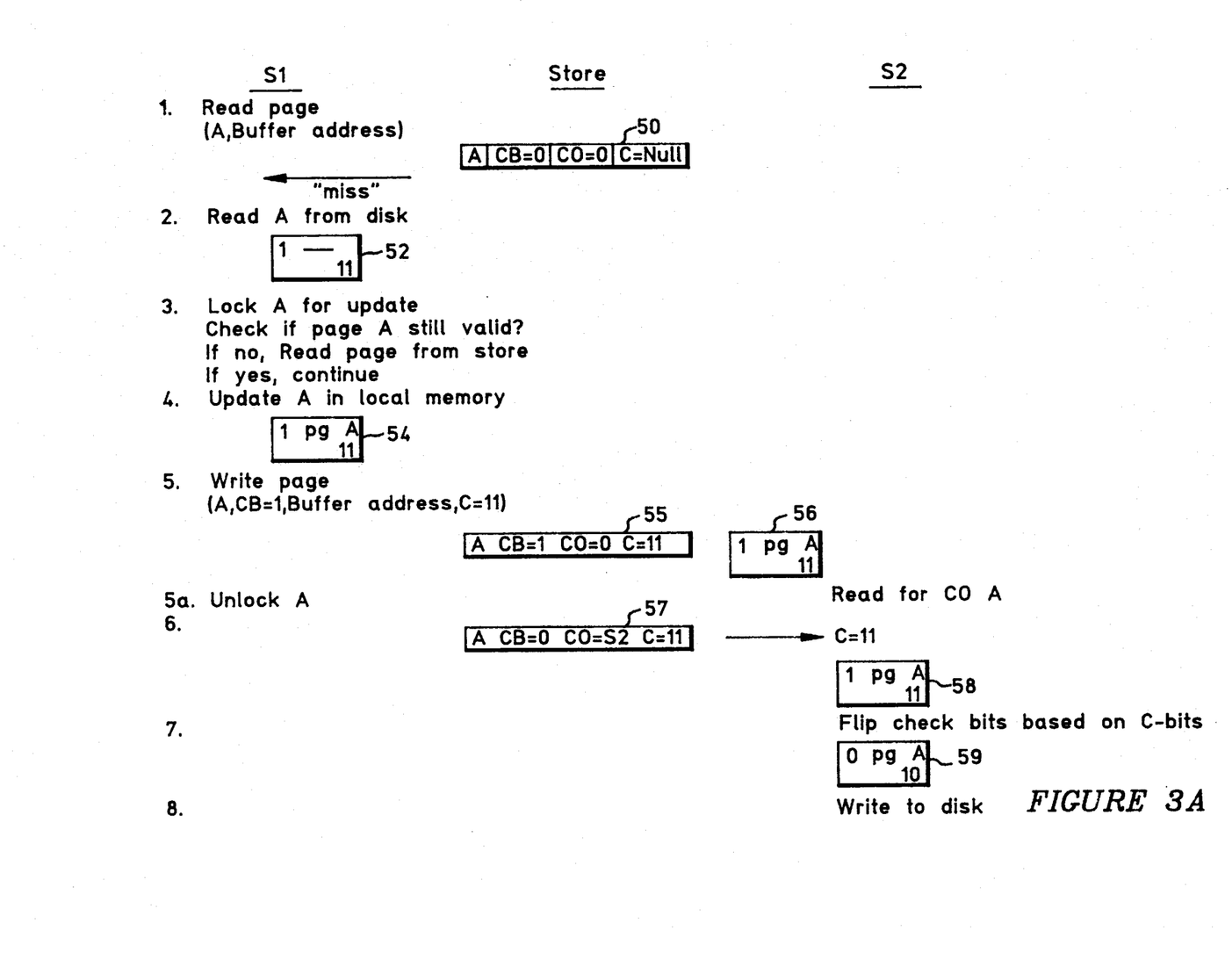
FIGS. 3A and 3B comprise a process flow diagram illustrating check bit processing according to the invention.
Figure 3B:
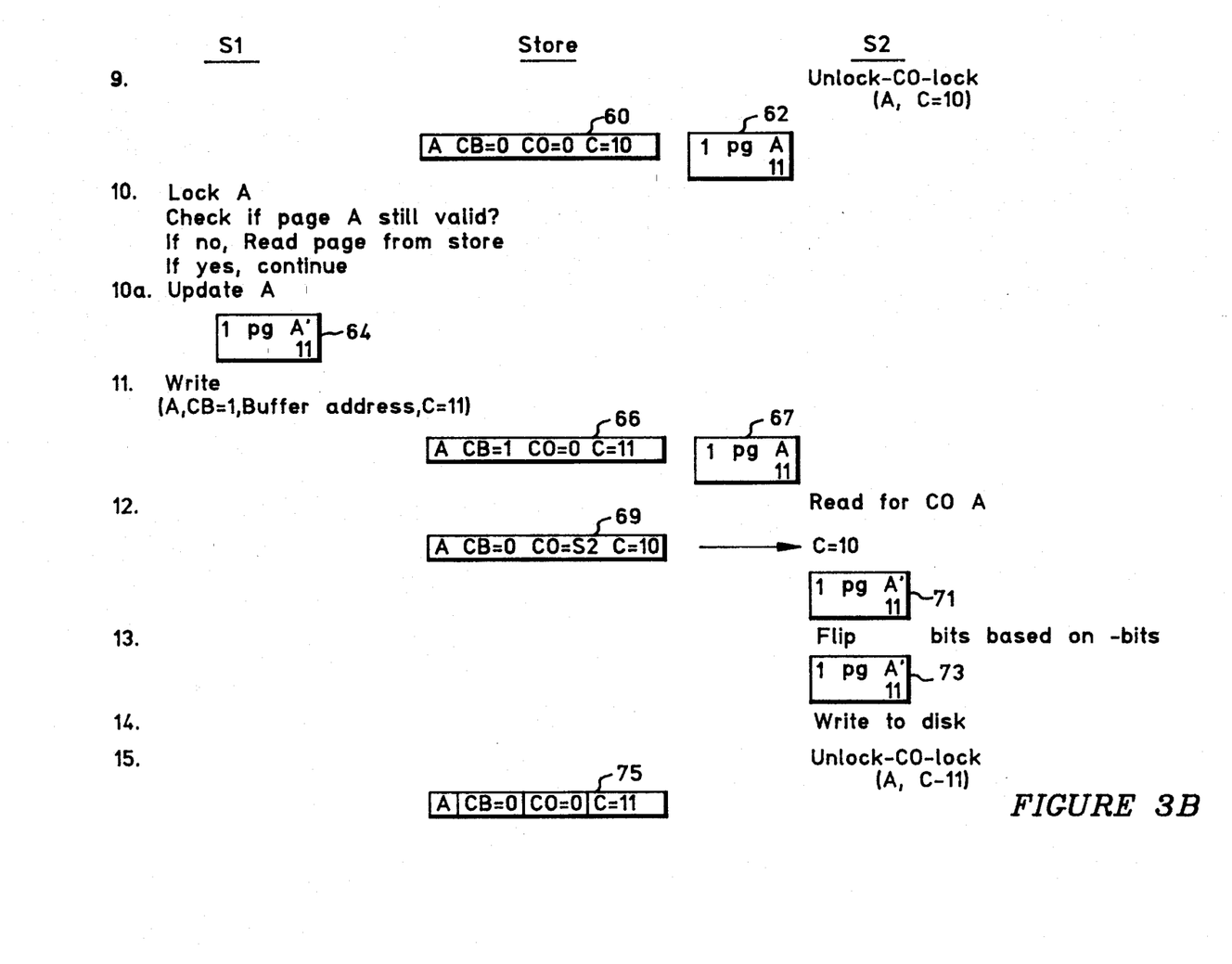

Refer now to FIGS. 3A and 3B for an example which illustrates the operation of the invention. In these figures, three columns are presented headed, respectively, S1, STORE, and S2. The column S1 refers to actions taken by a first DBMS, the STORE column to the actions taken by the store 20, and the column S2 to the actions taken by a second DBMS. These figures refer to page A which is represented in them by 52. The directory entry for page A is represented by a rectangular FIG. 50. The directory entry in these figures shows only the name, change bit (CB), COL-id (CO), and C-bits (C) fields, it being understood that other fields may be included in the entry as required. Finally, the secondary storage is presumed to consist of a disk storage device, referred to simply as "disk" in the figures.

Referring now to FIGS. 3A and 3B, it is assumed that, initially, page A does not reside in the shared store 20, and that no system has yet issued a READ command for it. Now, system S1 issues a READ PAGE command in step 1 to the shared store 20 for page A. In response, the shared store 20 inspects its directory, searching for an entry for the named page. Finding no entry, the shared store creates one as indicated by reference numeral 50, initializing the CB and CO fields to 0 and placing the null value in the C field. The shared store then returns a cache miss indication to system S1, prompting the system to read page A from the disk storage device in step 2. The state of page A is indicated by reference number 52, which shows the states of the check bits as 2 11.

In step 3, the system S1 obtains a global lock on page A in order to update it. For the purpose of this embodiment, it is asserted that in response to a request for an update lock on a page, the locking mechanism (which may be a global one co-located and cooperative with the shared store 20) returns an indication as to page validity. In this regard, page validity is derived from the SV bit vector of the directory entry which records updating activity by a system. Processing of these bits can be understood with reference to incorporated U.S. patent application Ser. No. 07/628,211. If the lock request returns an indication that page A is not valid, the page is read by system S1 from the shared store 20. In either case, the lock is granted and the system proceeds to step 4.

In step 4, page A is cached in the working memory of the processor executing system S1, the page is locked and updated, and then in step 5, a WRITE PAGE command is issued to the shared store 20. The WRITE command identifies the page, returns a CB value of 1, a C value of 11, and the buffer address in the working memory where the changed page is located. The DBMS in system S1 provides the non-null value for the C bits with the WRITE command since the command was preceded by a cache miss and the page was valid because no other system had updated the page between the READ miss and the lock grant. The shared store in processing the WRITE PAGE command sets the C-bits in the directory to the value provided with the command since the previous value of the field was null and both CB and CO fields are zeros. Relatedly, if the previous value had been non-null, the C-bits provided in step 5 would not be entered into the directory entry. The condition of the directory entry for page A following the command is denoted by reference numeral 55. The page 56 is now stored in the shared cache 32 of the shared store, where it is available to all other systems.

Assume now that substantially coincident with system S1 unlocking page A, system S2 issues a READ-FOR-CASTOUT command for page A in step 6. In response to the command, the shared store 20 resets the CB field of the directory entry, enters system S2's identification in the CO field, but leaves the C field untouched. This is indicated by reference numeral 57. In the return response to the READ-FOR-CASTOUT command, the shared store returns the C-bits value which, in the example, is 11. Step 6 is completed by the shared store writing page A to the working memory of system S2 at the designated buffer location. The condition of page A in the buffer of system S2 is indicated by reference numeral 58.

Now, in step 7, the DBMS of system S2 flips the check bits in the version of A in its working memory. The resulting condition of page A in the working memory is indicated by reference numeral 59. In step 8, system S2 writes page A to disk.

Following the write to disk, the system S2 issues the UNLOCK-CASTOUT-LOCK command to the shared store in step 9 returning, with the command, the page identification, the system-id 52, and the flipped C-bits value. In response, the shared store clears the CO field and enters the C-bits value provided into the C field of page A's directory entry, as indicated by reference numeral 61. Note that page A in its updated version is still resident in the shared cache 32, having the form illustrated by reference numeral 62. The check bits in page A in the store are obsolete. This is because the check bits of the page in secondary store are different than those of the page in the store. It is the non-null value of the C field of the directory entry 60 which actually represents the check bits in the secondary storage version of the page.

In step 10, system S1 requests a lock for updating page A. Again, the return to the lock request indicates if page A is still valid. In this regard, note that the READ-FOR-CASTOUT/UNLOCK-CASTOUT-LOCK sequence affects the value of the CB field of the directory entry for page A. Since the castout process is non-blocking, another system could have updated page A while the castout process was executing. In the event of this, the S-bits for all systems, save the updating system, would be set to a value indicating that the version of page A which they had would be invalid. If invalid, page A would be obtained again from the store. Assume for the example that such is not the case, the lock is granted, and system S1 updates page A to the form indicated by reference numeral 64.

Following the second update of page A by system S1, which occurs after page A has been cast out to the disk, system S1 once again in step 11, writes its updated version of page A to the shared cache 32 with a WRITE PAGE command. Now, the WRITE PAGE parameter list returns a null value for the C-bits since system S1 would have noted in step 4 that the page state had changed (with respect to disk). If another system, say S3, had read page A with an indication that the page was changed, and had updated it, system S3 would also provide C=null in its WRITE PAGE parameter list. In response to the WRITE PAGE command of system S1, the shared store 20 alters the directory entry as indicated by 66 and entered into the shared cache the version of the page indicated by 67.

In step 12, system S2 again reads page A for castout, resulting in consequent changes in the CB and CO fields of the directory entry for page A as illustrated by 69. The return for the READ-FOR-CASTOUT command provides a C-bit value of 10 and the page version indicated by reference numeral 71.

In step 13, the system S2 processes the check bits on the page in its working memory in preparation for writing the page to disk. The value of the check bits in the page is different than the C-bit value returned for the castout command. Since the flipped C-bit value is identical to the desired check bits on the page for the disk write, system S2 does not flip the check bits in the page version 71; instead, the page is written unchanged as indicated by reference numeral 73 to disk in step 14, the UNLOCK-CASTOUT-LOCK command is issued in step 15 with the parameter list including a C-bit value of 11 and the shared store changes the directory entry by zeroing the C field and entering the returned C-bit value in the C field as indicated by reference numeral 75.

With reference to the just-described example, it is noted that the check bits of the disk version of a page are represented by the C-bits in the directory entry of the page in the store. The check bits in the page which is cached in the working memory of a processor or in the shared store cannot always be trusted. This is because of the non-blocking serialization between updates and castout. The casting-out system always infers the check bits from the non-null value of the C-bits returned from the shared store before doing the disk write. Although not shown in the example, when the value of the C-bits returned by the shared store is null, the casting-out system determines check bits by actual reading of the page from disk.

When a page's state goes from clean to dirty, the page's C-bits are passed to the shared store with the WRITE PAGE command. It is important to note that only one system would cause the state change because of the global lock on the page for the update. This gives rise to conditions under which the C-bits can be inferred from the check bits of the page cached in working memory or the shared store and then passed to the shared store. Typically, a READ PAGE command always precedes the WRITE PAGE command which writes a dirty page to the shared store. Such a WRITE PAGE command is issued with CB=1. At the time of the WRITE, the DBMS determines whether the non-null or the null value of the C-bits is to be provided in the parameter list of the WRITE PAGE command. The DBMS provides the non-null value only if the preceding READ PAGE command elicited a cache miss response or if the return indicated that the page was unchanged. The DBMS either computes the non-null value of the C-bits of the page in its memory or passes back the C-bits which were returned by a READ PAGE which scores a cache hit. Even though a READ PAGE command may not be done under a global lock, the reading DBMS does obtain a global lock to update and under the global lock checks whether the cached page is still valid. If not, the page is read again via the READ PAGE command, thereby re-evaluating the passing of the non-null C-bits in the WRITE PAGE command. If the page is updated locally multiple times without an intervening read from the shared store, the DBMS would pass the non-null value only on the first WRITE PAGE command, and the null value on all subsequent writes.

The READ-FOR-CASTOUT command gets the C-bits from the shared store along with the page to be castout. The casting-out system computes the check bits for the page based upon the C-bits and updates the page with the check bits. It should be noted that the casting-out system does not compute the check bits based on the value in the page since coherence of these bits in the page is not maintained across different systems.

USAGE SCENARIO OF
RESET-CASTOUT-LOCK COMMAND

The shared store sets the C-bits to null when the RESET-CASTOUT-LOCK command is issued. This command would be issued in the event of a failure occurring after a READ-FOR-CASTOUT command but before the following UNLOCK-CASTOUT-LOCK command. In between these two commands, it is not certain whether the disk write did take place. Therefore, the RESET-CASTOUT-LOCK command sets the C-bits to null, implying that the value of the check bits of the disk version of the page is "unknown". On a subsequent READ-FOR-CASTOUT command, the shared store returns a null value for the C-bits. In this case, the casting-out system would read the page from the disk to determine the true check bit value from the disk version of the page and then will set the page check bits to the flipped value and return it via the UNLOCK-CASTOUT-LOCK command. The casting-out system may or may not have to perform a disk WRITE depending upon whether the page has changed since the last successful disk WRITE (whether the page has been changed since the last disk write can be determined by, for example, comparing the update sequence number in the disk version 7 the page with that in the version returned by the shared store in response to READ-FOR-CASTOUT command). It is expected that this command would be issued very rarely and for only a few pages, at most.

Manifestly, the reasonably skilled artisan will understand that, although the invention has been shown and described in respect of a specific embodiment, various changes, additions, and omissions in the form and details of the invention may be made without departing from the spirit and scope of the invention, which is expressed in the following claims.

We claim:

1. In a database system accessible from a plurality of computers using a common store-in cache and a secondary storage, a method of detecting a partial write of a page of data from the cache to the secondary storage, comprising the steps of:

storing values for page check bits at the beginning and end of a cached page, wherein a check bit pattern at the beginning of the page has a designated corresponding check bit pattern at the end of the page;

storing secondary storage check bits in check bits of a cache directory, wherein said secondary storage check bits comprise check bits of a page corresponding to the cached page and stored in the secondary storage;

signaling the cache that the cached page will be written to the secondary storage;

setting the page check bits to differ from the cache directory check bits for the cached page;

writing the cached page to the secondary storage by overwriting the corresponding secondary storage page;

reading the page from secondary storage; and indicating a write error if the check bits at the beginning of the cached page do not have a designated correspondence with the check bits at the end of the cached page.

2. The method of claim 1, further including following the signaling steps, reading the page from the cache.

3. The method of claim 2, further including the step of changing the cached directory bits to the values for the check bits obtained in setting step.

4. A machine-executed method for maintaining write error bits in data stored in a system which includes:

secondary storage including one or more storage devices for storage of the data in pages;

a plurality of database management processors, each database management processor being connected to the secondary storage; and a shared store, separate from the secondary storage, connected to each of the database management processors for store-in caching of pages;

wherein, each page includes check bits at its beginning and end which are inverted each time the page is written to the secondary storage, the method including the steps of:

storing values for page check bits at the beginning and end of a cached page wherein a check bit pattern at the beginning of the page has a designated corresponding check bit pattern at the end of the page;

storing secondary storage check bits in check bits of a store directory, wherein said secondary storage check bits comprise check bits of a page corresponding to the cached page and stored in the secondary storage;

signaling the shared store that a cached page will be written to secondary storage;

setting the page check bits to differ from the store directory check bits for the cached page;

writing the cached page to the secondary storage by overwriting the corresponding secondary storage page; and changing the stored directory check bits to the values for the check bits obtained in the setting step.

5. The method of claim 4, further including, after the signaling step and before the setting step, reading the cached page from the shared store for entry into the secondary storage.

6. A machine-executed method for maintaining WRITE error check bits in data stored in a system which includes:

secondary storage including one or more storage devices for storage of the data in predetermined units of transfer ("data units");

a plurality of database management processors, each database management processor including its own memory and being connected to the secondary storage;

a shared store, separate from the secondary storage, connected to each of the database management processors for store-in caching of data units; and a shared store directory containing one or more directory entries, each directory entry corresponding to a data unit which has been requested from the shared store or a data unit which has been written to the shared store;

the method including the steps of:

reading a data unit from secondary storage into a first database management processor memory, the data unit including check bits at the beginning and end;

generating a directory entry for the data unit, the directory entry including a C-bit field for storage of the data unit's check bits;

initially setting the C-bit field to a NULL value;

producing an updated data unit by altering the data unit in the first database management processor memory;

writing the updated data unit to the shared store without changing the check bits reading the updated data unit from the shared store into a second database management processor memory for entry of the updated data unit into secondary storage;

inverting the check bits in the updated data unit in the second database management processor memory; and writing the updated data unit to secondary storage from the second database management system.

7. The method of claim 6, wherein the step of writing the updated data unit to the shared store includes the steps of:

issuing a WRITE command to the shared store for writing the updated data unit to the shared store;

providing the check bits to the shared store with the WRITE command; and entering the check bits into the C-bit field of the directory entry for the data unit to the value of the check bits provided with the WRITE command.

8. The method of claim 7, further including the step of retaining a copy of the data unit in secondary storage:

and wherein the step of reading the updated data unit includes:

issuing a READ-FOR-CASTOUT command to the shared store from the second database management processor;

providing a value in the C-bit field of the directory entry for the data unit and the updated data unit from the shared store to the second database management processor in response to the READ-FOR-CASTOUT command;

if the C-bit field value provided to the second database management process is NULL, obtaining checkbits from the copy of the data unit in secondary storage and, in the inverting step, obtaining inverted checkbits by inverting the checkbits obtained from secondary storage, and placing the inverted checkbits in the updated data unit at the second database management processor;

otherwise, performing the inverting step using the checkbits in the updated data unit.

9. The method of claim 7, further including the steps of:

detecting failure in one or more of the steps of reading the updated data unit from the shared store, inverting the checkbits in the updated data unit, and writing the updated data unit to secondary storage; and setting the value in the C-bit field of the directory entry for the data unit to NULL.

* * * * *

UNITED STATES PATENT AND TRADEMARK OFFICE
CERTIFICATE OF CORRECTION

PATENT NO. : 5,455,942
DATED : October 3, 1995
INVENTOR(S) : Mohan et al

It is certified that error appears in the above-indentified patent and that said Letters Patent is hereby corrected as shown below:

Column 10, line 61, change "steps" to --step--.

Column 12, line 22, please delete the first occurrence of "the";
line 23, change "to" to --having--.

Signed and Sealed this

Twenty-fifth Day of June, 1996

Attest:

BRUCE LEHMAN

*Attesting Officer*  *Commissioner of Patents and Trademarks*